(12) United States Patent  (10) Patent No.: US 8,498,386 B2
Yoo et al.  (45) Date of Patent: Jul. 30, 2013

(54) ON HOLD CONTENT SELECTION

(75) Inventors: James H. Yoo, Clarksville, MD (US); Chieh-Chien Lin, Gaithersburg, MD (US)

(73) Assignee: Verizon Services Corp., Ashburn, VA (US)

( * ) Notice: Subject to any disclaimer, the term of this patent is extended or adjusted under 35 U.S.C. 154(b) by 1211 days.

(21) Appl. No.: 11/591,882

(22) Filed: Nov. 2, 2006

(65) Prior Publication Data

US 2008/0107245 A1   May 8, 2008

(51) Int. Cl.
    *H04M 1/64* (2006.01)
(52) U.S. Cl.
    USPC .................................. 379/88.22; 279/215.01

(58) Field of Classification Search
    USPC .......................................... 379/265, 266, 186
    See application file for complete search history.

(56) References Cited

U.S. PATENT DOCUMENTS

| 5,166,974 A * | 11/1992 | Morganstein et al. ....... 379/67.1 |
| 5,974,122 A * | 10/1999 | Nelson et al. ............ 379/100.09 |
| 2002/0196926 A1* | 12/2002 | Johnson et al. .......... 379/265.02 |
| 2006/0182247 A1* | 8/2006 | Batni et al. .................... 379/189 |
| 2007/0003043 A1* | 1/2007 | Kapur ...................... 379/211.02 |

\* cited by examiner

*Primary Examiner* — Curtis Kuntz
*Assistant Examiner* — Amal Zenati

(57) ABSTRACT

A message is received that a call has been made to a destination. It is determined that the destination is not available. A menu of options is provided for receiving content while the destination is not available. A selection of one of the menu options is received. Content is provided according to the selection.

36 Claims, 3 Drawing Sheets

ON HOLD CONTENT SELECTION

BACKGROUND INFORMATION

Billions of advertising dollars are spent annually by businesses who want to receive telephone calls from customers or potential customers. Forcing a caller to wait when placing a call, e.g., by placing a caller on hold for any length of time, could mean the difference between a satisfied customer and a loss of business. Accordingly, content such as music, news, advertisements, etc. are often played to callers waiting to be connected to a business representative such as an agent in a call center. The object of playing such content is generally to prevent the caller from hanging up his or her telephone while waiting to speak to a business representative.

However, callers listening to bland content chosen not to offend a wide range of people may become disinterested and disinclined to wait when put on hold. This problem is particularly acute in the case of callers who are already upset or angry because they are experiencing billing problems, technical problems, etc. As a result, callers waiting on hold often hang up, to the detriment of the called party, which could profit from receiving the call.

DETAILED DESCRIPTION OF THE PREFERRED EMBODIMENTS

A calling party may be provided an option to select content such as a musical selection from a library of electronic content when on hold, i.e., while waiting for a temporarily unavailable destination, such as a called telephone, a call center agent, etc. when making a call or during a call in progress. Accordingly, when a destination is determined to be unavailable, the calling party or point of origin for the call is notified and instructed by a user interface to select content to listen to until the destination becomes available. The calling party is provided with a content menu and is prompted to make a selection. The user interface is responsive to commands received from the point of origin over the telephone connection, e.g., dual tone multiple frequency (DTMF) signals or voice commands. The calling party's choice of music is played until the destination becomes available and the parties are connected. Thus, the calling party is allowed to select the content to listen to while on hold, which may result in increased customer satisfaction, and may prevent a party at a point of origin from terminating a call before the call can be connected to a destination, e.g., a live human being or an interactive voice response (IVR) application.

Figure 1:
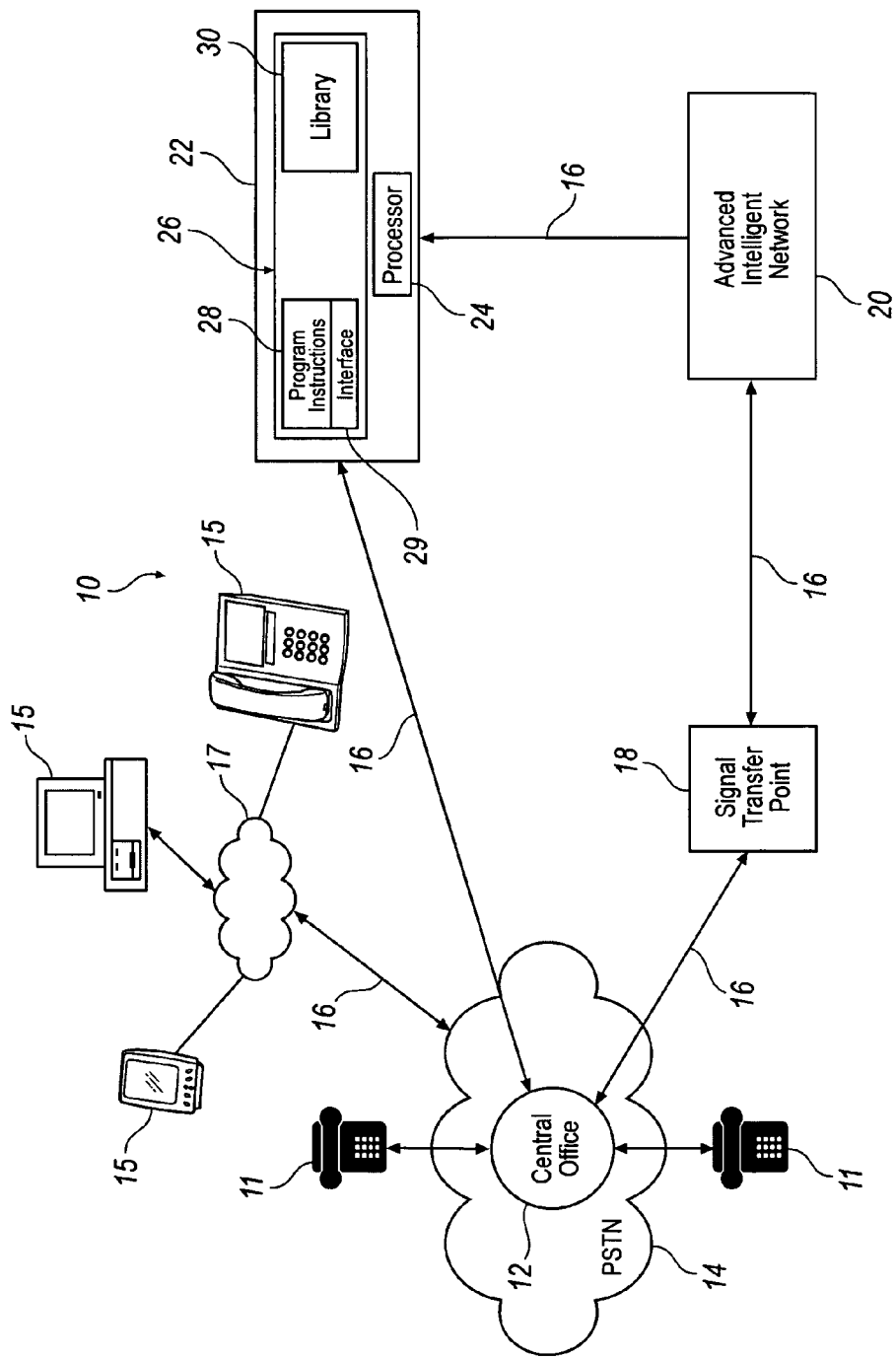
FIG. 1 illustrates an exemplary system allowing selected content to be provided when a call is placed on hold.

FIG. 1 illustrates an exemplary system 10 for providing content to a calling party, e.g., to a user of a telephone 11 or digital telephony device 15, while the calling party awaits connection to a destination, e.g. to another telephone 11, device 15, etc. System 10 may include known telecommunications network elements such as telephones 11, central office 12, digital telephony devices 15, network links 16, packet switched network 17, public switched telephone network (PSTN) 14, signal transfer point (STP) 18, advanced intelligent network (AIN) 20, and intelligent voice response unit/intelligent peripheral (IVRU/IP) 22.

Telephones 11 are known analog or digital telephones, and may be connected to central office 12 via a wire loop and/or other telephony equipment, such as a private branch exchange (PBX). Telephones 11 generally make and receive calls through PSTN 14. Digital telephony devices 15 may be any of a number of known devices for placing and/or receiving telephone calls via packet switched network 17, e.g., an internet protocol (IP) telephone, a personal computer, laptop computer, handheld computer, etc.

Network links 16 may include a variety of known links between and within networks such as packet switched network 17, PSTN 14, etc. For example, network links 16 may include a gateway interface such as is known for transporting communications from a digital network such as network 17 to an analog network such as PSTN 14. Further, links 16 may include a link for Signaling System 7 (SS7) communications, as discussed further below. Links 16 may also include connections between other components of system 10, such as STP 18, AIN 20, and IVRU/IP 22, and may use copper wires, fiber optic cables, wireless connections, etc.

Packet switched network 17 is generally an internet protocol (IP) network such as the Internet.

Central office 12, as is known, is included in PSTN 14. Central office 12 includes switching equipment that connects telephone users to each other, both locally and via long distance carriers. Central office 12 may receive calls originating from within or without PSTN 14; e.g., from a conventional telephone 11, from digital telephony device 15 via packet-switched network 17, etc., for routing and establishing a connection to a called telephone 11, a called digital telephony device 15, etc.

STP 18 generally communicates with central office 12 using known protocols such as Signaling System 7 (SS7), e.g., via a network link 16. SS7 is known as a set of telephony signaling protocols that are used to set up the vast majority of the world's PSTN telephone calls. Those skilled in the art will recognize that STP 18 is a specialized switch that provides access to a Signaling System 7 (SS7) link 16 and provides routing for SS7 messages between the central office 12 and AIN 20.

AIN 20 is a known telecommunications network computing device for implementing various logical rules in PSTN 14, including logic for routing calls, establishing connections, and providing advanced features such as voice mail, call forwarding, etc. For example, one function of AIN 20 may be to determine, when a call is being routed to called telephone 11, whether the line connected to called telephone 11 is busy. If so, AIN 20 may cause a busy signal to be played over a calling telephone 11, may route the call to a voice mailbox, etc.

Further included in system 10, according to an embodiment, is IVRU/IP 22, which communicates with AIN 20 and central office 12, e.g., via links 16. IVRU/IP 22 is known for allowing users to select menu items, receive information, etc., in response to voice inputs. IVRU/IP 22 generally includes processor 24 along with one or more computer-readable media 26. Medium 26 generally stores program instructions 28. Such program instructions 28 may be compiled or interpreted from computer programs created using a variety of programming languages and/or technologies known to those skilled in the art, including, without limitation and either alone or in combination, proprietary languages, Java™, C, C++, Visual Basic, Java Script, Perl, etc. In general, processor 24 (e.g., a microprocessor) receives program instructions 28; e.g., from a computer-readable medium 26, etc., and executes these instructions, thereby performing one or more processes, including one or more of the processes described herein. For example, if a call is placed from a calling telephone 11 to an unassigned telephone number, processor 24 may execute program instructions that cause an announcement to be played which instructs the calling party to check the number and try the call again. Such program instructions and other data may be stored and transmitted using a variety of known computer-readable media 26.

A computer-readable medium, including media 26, includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Program instructions 28 include instructions for providing user interface 29 that allows a user at calling telephone 11 to be provided information and to interact with IVRU/IP 22. Further, IVRU/IP 22 may be programmed to provide a notification to a point of origin such as calling telephone 11, e.g., via voice message, when a line attached to a destination such as called telephone 11 is unavailable. Thereafter, voice instructions may be provided to a user of calling telephone 11 to select content, such as a musical selection, a type of music, a news report, etc., until called telephone 11 becomes available. Accordingly, a user of calling telephone 11 may be allowed to select content from a menu provided by user interface 29, which is configured to respond to command signals received from calling telephone 11. Such command signals may be in the form of, but not limited to, dual tone multiple frequency (DTMF) signals and/or voice commands. For example, when prompted by user interface 29 to select a type of music to listen to while on hold, a user of calling telephone 11 may press the number five on a keypad to select jazz music, or press the number nine to select classical music. As is known, pressing a number on a telephone keypad may cause a DTMF signal to be generated. Upon receiving a predetermined DTMF signal, IVRU/IP 22 may be instructed to respond by providing a requested musical selection, or perhaps a musical selection according to a requested type of music (e.g., jazz, classical, rock, etc.) to the calling telephone 11. Further, it should be understood that two or more numbers on a telephone keypad may be combined for allowing the calling party to select a music choice. Alternatively or additionally, user interface 29 may be configured to receive voice commands from the calling party when making a selection to be played.

Further, it should be understood that embodiments are possible in which digital telephony device 15 includes a user interface, e.g., a graphical user interface (GUI), that is programmed to receive and display to a user of device 15 content selections from a computer server in the place of or associated with IVRU/IP 22. Such a GUI could be included within or integrated with presently existing client software for device 15. For example, where digital telephone device 15 is a computer, an integrated telephony management service (ITCMS) client, such as a client for the "iobi" service provided by Verizon Communications, Inc. of New York, N.Y., may be included in device 15. An ITCMS client generally communicates with computing devices such as AIN 20 to allow users to manage ITCMS services such as call forwarding, caller identification, voice mail, real time call transfer, etc. Accordingly, a user of an ITCMS client could further be provided with the ability to receive options for receiving content while waiting for a call to be connecting, and for selecting among such options.

In an embodiment, a portion of the media 26 included in IVRU/IP 22 contains content library 30 from which electronic audio can be played back in response to commands received from called telephone 11 via user interface 29. Library 30 could also be included within a database or computing device external and connected to IVRU/IP 22. Generally, library 30 includes digital audio files stored according to one or more known compression standards; e.g., MPEG-1 Audio Layer 3 (MP3), WavPack, Windows Medium Audio (WMA), etc. Further, embodiments are possible in which library 30 includes media files other than audio. For example, in embodiments in which content is to be received by digital telephony device 15, it may be desirable to include video files in library 30, so as to provide a richer and more captivating experience to a user waiting for a phone call to be connected to a live human being. Video files are generally stored according to known compression standards, such as one of the well known standards promulgated by the Motion Picture Experts Group (MPEG).

Library 30 may be configured to allow content such as music to be selected by type, e.g., classical, jazz, and rap. Further, library 30 may support more specific criteria for selecting content, such as the name of a song, artist, composer, author, or producer. Further, library 30 may provide other information which can be selected for play-back as an alternative to music, such as advertisements, weather reports, news reports, etc. Embodiments are possible in which library 30 is used to provide content fed on a real-time or near real-time basis, such as news reporting, coverage of sporting events, etc.

Figure 2:
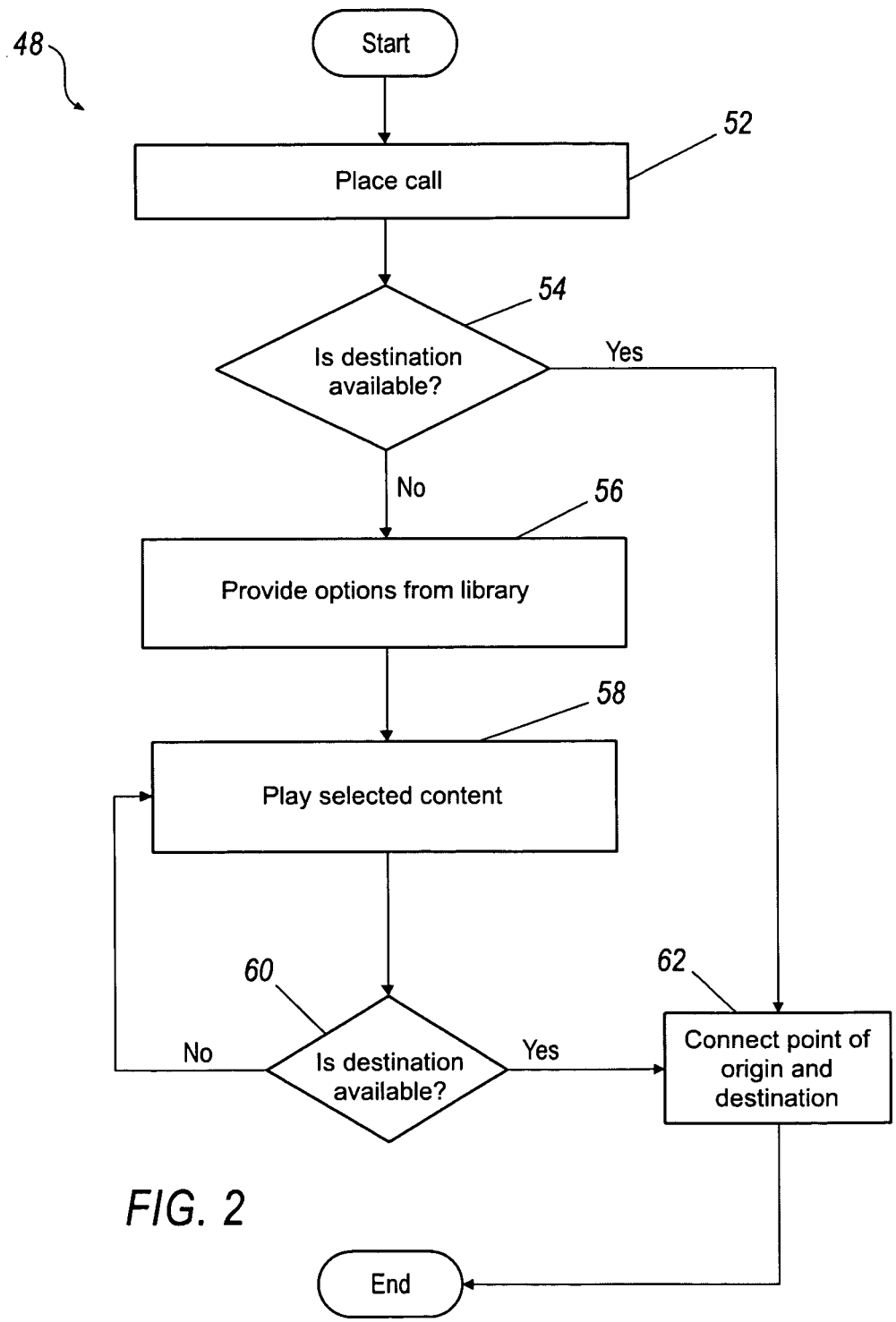
FIG. 2 illustrates an exemplary process for providing selected content when a call is placed on hold.

FIG. 2 generally illustrates an exemplary process 48 for providing a calling party, e.g., a user of one of telephones 11 or device 15, with selected content while on hold, for example, while awaiting connection to a destination such as another one of telephones 11 or device 15 or while placed on hold by a user of a destination telephone 11 or device 15, etc. In general, telephones 11 and devices 15 represent points of origination and destinations for calls made over networks 14 and/or 17. It should be understood throughout the description of process 48 that, instead of telephones 11 attached to PSTN 14, digital telephony device 15 could be placing and/or receiving calls. Further, it is to be understood that a computing and switching device such as a private branch exchange (PBX) could be configured to make determinations regarding the availability of telephone 11, as described herein, and also to store content library 30 and to provide a menu for selecting content therefrom. Moreover, as mentioned above, a computing device other than IVRU/IP 22, such as AIN 20 or a server associated with an ITCMS, could provide menus and/or content to digital telephony device 15. In general, telephones 11 and devices 15 may operate automatically, e.g., solely according to computer-executable instructions, or may be operated by a human being. For example, as mentioned above, a destination could include an IVR application rather than a telephone or device operated by a human user. Further, telephones 11 and devices 15 other than the specific examples discussed herein may be used in various embodiments as points of origin and/or destinations for calls.

Turning now to process 48, in step 52, a call is made by a point of origination to a destination, such as between a calling telephone 11 and a called telephone 11, a calling telephone 11 and a called device 15, etc.

Next, in step 54, AIN 20 determines whether the destination, e.g., called telephone 11, called device 15, etc. is available. For example, where the destination is a telephone 11 associated with PSTN 14, such determination may be accomplished when a message such as an event trigger is received by AIN 20 from STP 18. Upon receiving a termination event trigger (TAT) such as is known, AIN 20 checks the status of the line connecting called telephone 11 to central office 12 to determine whether called telephone 11 is available. Similar messaging in network 17 may be used in the case where the destination is a device 15. If the destination is available, step 62 is executed next. However, if the destination is not available, step 56 is executed next.

In step 56, a menu of content options is provided to the destination. For example, in cases where the destination is a telephone 11 connected to PSTN 14, AIN 20 sends a message to IVRU/IP 22 to provide a menu of content options to telephone 11, and IVRU/IP 22 notifies a user at point of origin telephone 11, e.g., via a voice notification, that destination telephone 11 is unavailable, and further instructs the user of point of origin telephone 11 to select content from a menu using, for example, the telephone keypad and/or voice commands as described above. Similarly, where the destination is a device 15 connected to network 17, programming instructions in device 15, or some other computing device connected to network 17, may cause a menu of content options to be provided to the destination device 15.

An alternative to steps 54 and 56 accommodates the known scenario in which a call has been established between a point of origin and a destination and then one telephone 11 or device 15 is placed on hold by the other. For ease of reference, a convention may be established for such an event in which the telephone 11 or device 15 that is placed on hold is referred to as the point of origin, regardless of whether such telephone 11 or device 15 originally made the call. When a point of origin is placed on hold, this event may be detected by a private branch exchange (PBX) or the like. The PBX, or other device, upon detecting that a point of origin has been placed on hold, may send a message to IVRU/IP 22, e.g., a message such as AIN 20 may send as described above with respect to step 56. IVRU/IP 22 then responds by providing a voice notification concerning options for content that may be heard while the destination is unavailable, e.g., by providing a menu of options for content such as was described above with respect to step 56.

Next, in step 58, IVRU/IP 22 plays a selected choice of content retrieved from content library 30 for the destination in response to receiving a command from the destination based on the menu of options.

Next, in step 60, AIN 20 determines whether the destination, e.g., called telephone 11, called device 15, etc. is available. For example, in an embodiment, AIN 20 checks the line connecting central office 12 to called telephone 11 at predetermined intervals, e.g., every ten seconds, to determine whether called telephone 11 is available. In one embodiment, until the destination is available, steps 58 and 60 are repeated, as shown in FIG. 2. However, embodiments are also possible in which a user at a point origin, e.g., calling telephone 11, calling device 15, etc. is allowed to provide input to make a different selection of content, e.g., music, news, etc., either while a content selection is playing or after it has ended. After it is determined in step 60 that the destination is available, step 62 is executed.

In step 62, the point of origin and the destination are connected.

Figure 3:
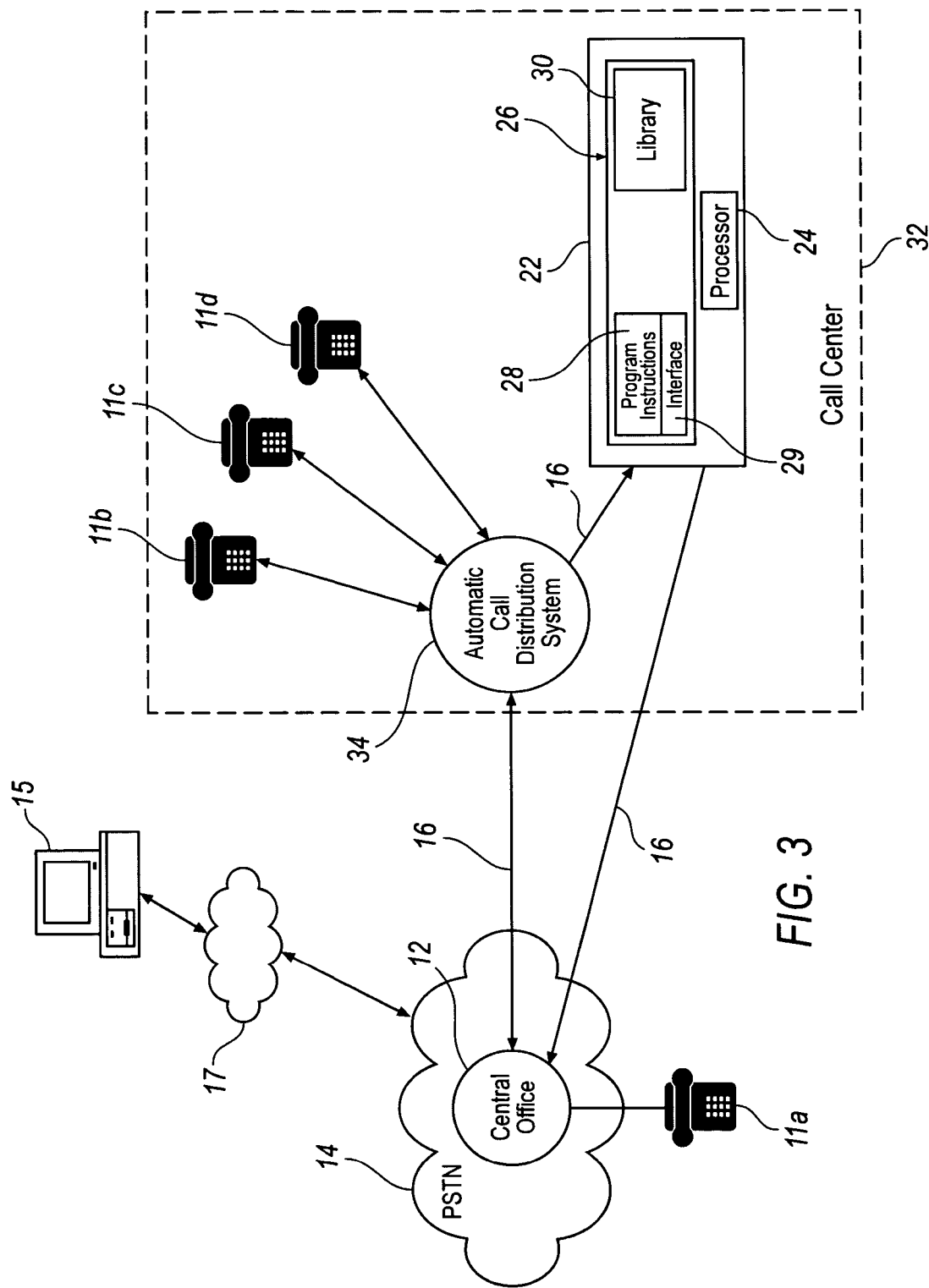
FIG. 3 illustrates another exemplary system allowing selected content to be provided when a call is placed on hold.

FIG. 3 illustrates an embodiment in which IVRU/IP 22 is located at a called party location, such as call center 32. A point of origin, e.g., calling telephone 11a places a call to call center 32, which call is received by a computing and switching device such as automatic call distribution (ACD) system 34 for distribution to the appropriate called telephone 11 or digital telephony device 15. ACD system 34, as is known, is a computerized telephony device that routes incoming telephone calls to a next available operator or agent at a telephone 11, 11c, 11d, etc.

ACD system 34 may respond to a call from calling telephone 11a, device 15, etc. with a voice menu seeking input to determine how the call should be routed. For example, for a point of origin having a billing question ACD 34 may route a call to a first agent at telephone 11b. For technical support the call may be routed to a second agent at telephone 11c. If ACD 34 determines that the requested agent 36 is unavailable, the call may be sent to the IVRU/IP 22, whereupon process 48 may be executed, with any of telephones 11b, 11c, 11d, etc. fulfilling the role of called telephone 11 as described above with respect to process 48.

It is to be understood that the above description is intended to be illustrative and not restrictive. Many embodiments and applications other than the examples provided will be appreciated in view the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   receiving a first message that a call has been made from a point of origin to a destination;
   establishing an initial connection between the point of origin and the destination;
   receiving a second message indicating that the destination is no longer available after the initial connection is established between the point of origin and the destination;
   after receiving the second message, providing a menu of options for receiving content while the destination is not available;
   receiving a first selection of one of the menu options;
   providing content according to the selection;
   periodically checking whether the destination remains unavailable after receiving the second message; and receiving at least one other selection of one of the menu options while, or after, said content is being provided until said destination no longer remains unavailable.

2. The method of claim 1, wherein a calling party uses one of an analog telephone, a digital telephone, and a digital telephony device to make the call.

3. The method of claim 1, wherein the destination is one of a human and an interactive voice response (IVR) application.

4. The method of claim 1, further comprising providing a notification to the point of origin that the destination is unavailable.

5. The method of claim 1, further comprising retrieving the content from a content library.

6. The method of claim 1, further comprising:
checking to determine whether the destination remains available after the initial connection is established with the destination; and
establishing a subsequent connection between the point of origin and the destination when the destination becomes available after receiving the second message indicating that the destination is no longer available.

7. The method of claim 1, wherein the content is audio content.

8. The method of claim 1, wherein the menu is provided by an interactive voice response unit/intelligent peripheral.

9. The method of claim 1, wherein the second message is received via Signaling System 7 (SS7) signaling.

10. The method of claim 1, wherein determining that the destination is not available includes using one of an advanced intelligent network, a private branch exchange, and an automated call distribution system.

11. The method of claim 1, tangibly embodied as computer-executable instructions stored on one or more computer-readable media.

12. The method of claim 1, wherein the content is one or more of music, news, and an advertisement.

13. A system, comprising:
at least a first computing device configured to receive a first message that a call has been made from a point of origin to a destination and to receive a second message indicating that the destination is no longer available after an initial connection is established between the point of origin and the destination;
a content library including electronic content;
a second computing device distinct from said first computing device in selective communication with the content library, the second computing device configured to:
receive the second message from the first computing device that the destination is unavailable;
provide a menu of options for receiving content upon receiving the second message;
receive a first selection of one of the menu options;
provide content from the content library according to the selection;
periodically check whether the destination remains unavailable after receiving the second message; and
receive at least one other selection of one of the menu options while, or after, said content is being provided until said destination no longer remains unavailable.

14. The system of claim 13, wherein a calling party uses one of an analog telephone, a digital telephone, and a digital telephony device to make the call.

15. The system of claim 13, wherein said first computing device is one of an advanced intelligent network, a private branch exchange, and an automated call distribution system.

16. The system of claim 13, wherein said second computing device is an interactive voice response unit/intelligent peripheral.

17. The system of claim 13, wherein the electronic content is one of music, news, and an advertisement.

18. The system of claim 13, wherein the second message is received via Signaling System 7 (SS7) signaling.

19. A system, comprising:
an advanced intelligent network (AIN) configured to receive a first message that a calling party has made a call to a called telephone and to determine whether the called party remains available after an initial connection is established between the calling party and the called party;
a content library including electronic content; and
an interactive voice response unit/intelligent peripheral in selective communication with the content library, the interactive voice response unit/intelligent peripheral configured to:
receive a second message from the AIN that the called party is no longer available;
upon receiving the second message, provide to the calling party a menu of options for receiving content;
receive a first selection of one of the menu options from the calling party;
provide content to the calling party according to the content selection; and
periodically check whether the destination remains unavailable after receiving the second message; and
receive at least one other selection of one of the menu options while, or after, said content is being provided until said destination no longer remains unavailable.

20. The system of claim 19, wherein at least one of a calling telephone and a called telephone is one of an analog telephone, a digital telephone, and a digital telephony device.

21. The system of claim 19, wherein the electronic content is one of music, news, and an advertisement.

22. The system of claim 19, wherein the second message is received via Signaling System 7 (SS7) signaling.

23. The method of claim 1, further comprising iteratively providing the first selection while the destination remains unavailable.

24. The method of claim 23, further comprising iteratively providing the at least one other selection while the destination remains unavailable.

25. The method of claim 1, wherein receiving at least one other selection of one of the menu options includes receiving the at least one other selection while the first selection is being provided to the point of origin.

26. The method of claim 1, wherein providing content according to the selection includes audibly playing the first selection at the point of origin; and
wherein receiving at least one other selection of one of the menu options includes receiving the at least one other selection after the first selection has finished playing.

27. A method, comprising:
receiving a first message that a call has been made from a point of origin to a destination;
establishing an initial connection between the point of origin and the destination;
receiving a second message indicating that the destination is not available;
providing a menu of options for receiving content while the destination is not available;
receiving a first selection of one of the menu options;
providing content according to the selection;

periodically checking whether the destination has become available after receiving the second message; and receiving at least one other selection of one of the menu options while, or after, said content is being provided until said destination becomes available.

28. The method of claim 27, further comprising providing a notification to the point of origin that the destination is not available.

29. The method of claim 27, further comprising retrieving the content from a content library.

30. The method of claim 27, further comprising:

checking to determine whether the destination is available after the initial connection is established with the destination; and establishing a subsequent connection between the point of origin and the destination if the destination becomes available after receiving the second message.

31. The method of claim 27, wherein the menu is provided by an interactive voice response unit/intelligent peripheral.

32. The method of claim 27, further comprising:

iteratively providing the first selection while the destination is not available; and iteratively providing the at least one other selection while the destination is not available.

33. The method of claim 27, wherein receiving at least one other selection of one of the menu options includes receiving the at least one other selection while the first selection is being provided to the point of origin.

34. The method of claim 27, wherein providing content according to the selection includes audibly playing the first selection at the point of origin; and wherein receiving at least one other selection of one of the menu options includes receiving the at least one other selection after the first selection has finished playing.

35. A system, comprising:

a content library including electronic content; and a computing device in selective communication with the content library, the computing device configured to:

receive a first message representing a call made from a point of origin to a destination:

establish an initial connection between the point of origin and the destination;

receive a second message indicating that a destination is not available;

provide a menu of options for receiving content upon receiving the second message;

receive a first selection of one of the menu options;

provide content from the content library according to the selection;

periodically check whether the destination is available after receiving the second message; and receive at least one other selection of one of the menu options while, or after, said content is being provided until said destination becomes available.

36. The system of claim 35, wherein the computing device includes an interactive voice response unit/intelligent peripheral.

* * * * *